United States Patent
Huang et al.

(10) Patent No.: US 11,570,994 B2
(45) Date of Patent: Feb. 7, 2023

(54) KILN

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Yen-Jen Yeh, Taichung (TW); Kuan-Chou Lin, Taichung (TW)

(73) Assignee: GRAND MATE CO., LTD., Taichung (TW)

( * ) Notice: Subject to any disclaimer, the term of this patent is extended or adjusted under 35 U.S.C. 154(b) by 375 days.

(21) Appl. No.: 16/906,275

(22) Filed: Jun. 19, 2020

(65) Prior Publication Data
US 2021/0392905 A1 Dec. 23, 2021

(51) Int. Cl.
*A21B 1/33* (2006.01)
*A21B 1/50* (2006.01)
(Continued)

(52) U.S. Cl.
CPC .................. *A21B 1/33* (2013.01); *A21B 1/50* (2013.01); *F24C 3/082* (2013.01); *F27D 1/0026* (2013.01); *F27D 2001/0066* (2013.01)

(58) Field of Classification Search
CPC ... A21B 1/33; A21B 1/50; F24C 3/082; F27D 1/0026; F27D 2001/0066
(Continued)

(56) References Cited

U.S. PATENT DOCUMENTS 1,891,802 A * 12/1932 Drew ....................... A21B 1/46
432/76
2,213,234 A * 9/1940 Tinnerman .............. F24C 15/12
126/39 B
(Continued)

FOREIGN PATENT DOCUMENTS

CN 2516076 Y 10/2002
CN 102949105 A 3/2013
(Continued)

OTHER PUBLICATIONS

English abstract for TWM563762U, Total of 1 page.
(Continued)

*Primary Examiner* — Avinash A Savani
(74) *Attorney, Agent, or Firm* — Apex Juris, PLLC; R Wylie; Tracy Heims

(57) ABSTRACT

A kiln includes a stage, a stove, a gas supply assembly, and a combustion device wherein, the stage includes a stage body and a carrier member. The stage body has a first chamber, while the carrier member is detachably disposed at the stage body. The stove is joined to the stage body and has an entry and a second chamber. The gas supply assembly is disposed at the stage body, and part of the gas supply assembly is located in the first chamber. The combustion device is located in the second chamber. The carrier member can be detached from the stage body and be moved out of the stove from the entry so that the first chamber communicates with the second chamber. In this way, the working space inside the kiln can be increased, which is convenient for users to repair and maintain the gas supply assembly or the combustion device.

19 Claims, 14 Drawing Sheets

(51) Int. Cl.
*F27D 1/00* (2006.01)
*F24C 3/08* (2006.01)

(58) Field of Classification Search
USPC ........................................... 432/162
See application file for complete search history.

(56) References Cited

U.S. PATENT DOCUMENTS

| | | | |
|---|---|---|---|
| 2,335,279 A * | 11/1943 | Hobson .................. | F24C 15/08 |
| | | | 126/39 B |
| 2,618,671 A * | 11/1952 | Van Der Pyl ............ | F27B 9/20 |
| | | | 373/134 |
| 9,145,898 B2 | 9/2015 | Laffler | |
| 10,064,244 B2 | 8/2018 | Cheng et al. | |
| 2019/0195502 A1 * | 6/2019 | Tseng ...................... | F24C 3/004 |

FOREIGN PATENT DOCUMENTS

| | | |
|---|---|---|
| CN | 103867765 A | 6/2014 |
| CN | 106419624 A | 2/2017 |
| CN | 109965719 A | 7/2019 |
| CN | 109965723 A | 7/2019 |
| TW | 493421 U | 7/2002 |
| TW | 200847982 A | 12/2008 |
| TW | M494575 U | 2/2015 |
| TW | I541482 B | 7/2016 |
| TW | M563762 U | 7/2018 |
| TW | I658805 B | 5/2019 |
| TW | 201927152 A | 7/2019 |

OTHER PUBLICATIONS

Search report for CN202010401270.9, dated Apr. 8, 2022, Total of two pages.
English abstract for CN109965719, Total of 1 page.
English abstract for CN102949105, Total of 1 page.
English abstract for CN2516076, Total of 1 page.
English abstract for CN103867765, Total of 1 page.
English abstract for CN106419624, Total of 1 page.
English abstract for CN109965723, Total of 1 page.
English abstract for TW493421, Total of 1 page.
English abstract for TW200847982, Total of 1 page.
English abstract for TWI541482, Total of 1 page.
English abstract for TWI658805, Total of 1 page.
English abstract for TWM494575, Total of 1 page.
Search report for TW 109115346, dated Dec. 10, 2020, Total of 1 page.
English abstract for TW201927152, Total of 1 page.

* cited by examiner

KILN

BACKGROUND OF THE INVENTION

Technical Field

The present invention is related to a heating apparatus, and more particularly to a kiln which burns gas to generate heat.

Description of Related Art

Traditional kilns are usually built by stacking stone material. During the kiln is in use, wood is added inside the kiln and is burned to heat the inside of the kiln. Food ingredients are then placed into the kiln for baking. When the wood is used as a heat source, the heating efficiency of traditional kilns is low and a lot of smoke is generated to pollute the air, though the purpose of heating food is achieved.

To solve the problem, a gas burning kiln has been developed, such as the Kiln disclosed in the Taiwan utility model patent M563762. The kiln includes a stove and a stage. A base is disposed between the stove and the stage and is fixed on the base for placing objects to be heated. A combustion device is provided in the stove, and gas supply assemblies such as gas valves are provided inside the stage.

The aforementioned kiln can improve traditional kilns. However, the base thereof is at the bottom of the stove, and when a user is to repair and maintain the combustion device inside the stove, he needs to hold his tool into a cavity of the stove. Due to the limited space of the cavity, the user's working space is restricted and it is not easy to carry out maintenance. Besides, if the gas supply assembly in the stage is to be repaired and maintained, the user needs to disassemble the stage to access the gas supply assembly, resulting in difficulties of maintenance.

Therefore, there is still a need to provide an improvement in the design of the kiln to overcome the aforementioned drawbacks.

BRIEF SUMMARY OF THE INVENTION

In view of the above, the object of the present invention is to provide a kiln that can increase the working space during maintenance.

The present invention provides a kiln including a stage, a stove, a gas supply assembly, and a combustion device wherein the stage body has an upper opening and a first chamber which is located therein and communicates with the upper opening, and the carrier member is detachably disposed at the stage body and covers the upper opening. The stove has an entry, a lower opening, and a second chamber which is located therein and communicates with the entry and the lower opening. The stove is joined to the stage body, while the lower opening faces the carrier member. The gas supply assembly is disposed at the stage body and communicates with a gas source, and part of the gas supply assembly is located at the first chamber. The combustion device is located in the second chamber and communicates with the gas supply assembly. The carrier member can be detached from the stage body and be moved out of the stove from the entry so that the first chamber communicates with the second chamber.

An advantage of the present invention is that after moving the carrier member out of the entry, there is no barrier to separate the first chamber from the second chamber, so that the working space inside the kiln can be increased, which is convenient for users to repair and maintain the gas supply assembly or the combustion device.

BRIEF DESCRIPTION OF THE SEVERAL VIEWS OF THE DRAWINGS

The present invention may be best understood by referring to the following detailed description of some illustrative embodiments in conjunction with the accompanying drawings, in which.

DETAILED DESCRIPTION OF THE INVENTION

Figure 1:
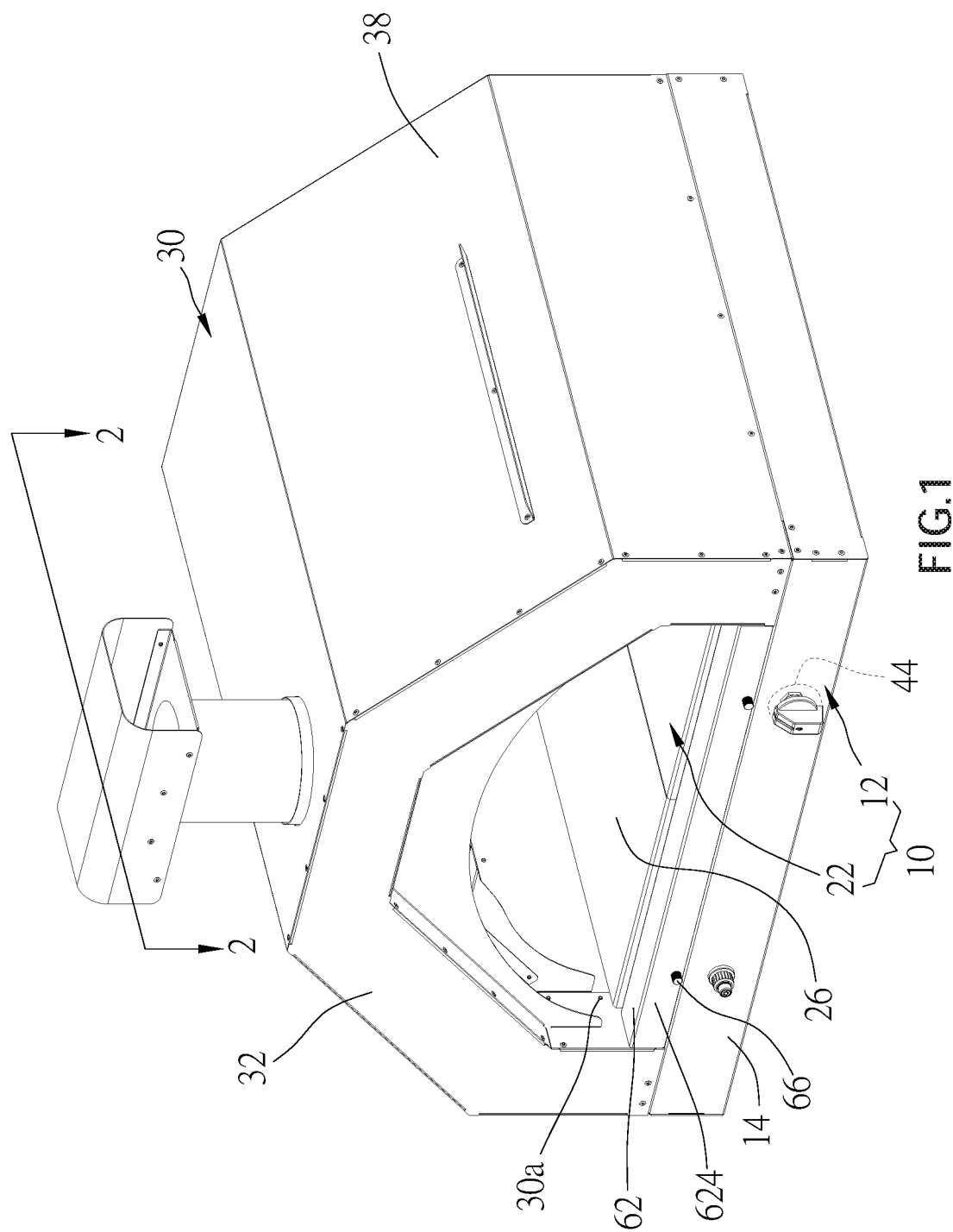
FIG. 1 is a perspective view of a kiln of a first embodiment according to the present invention.
Figure 2:
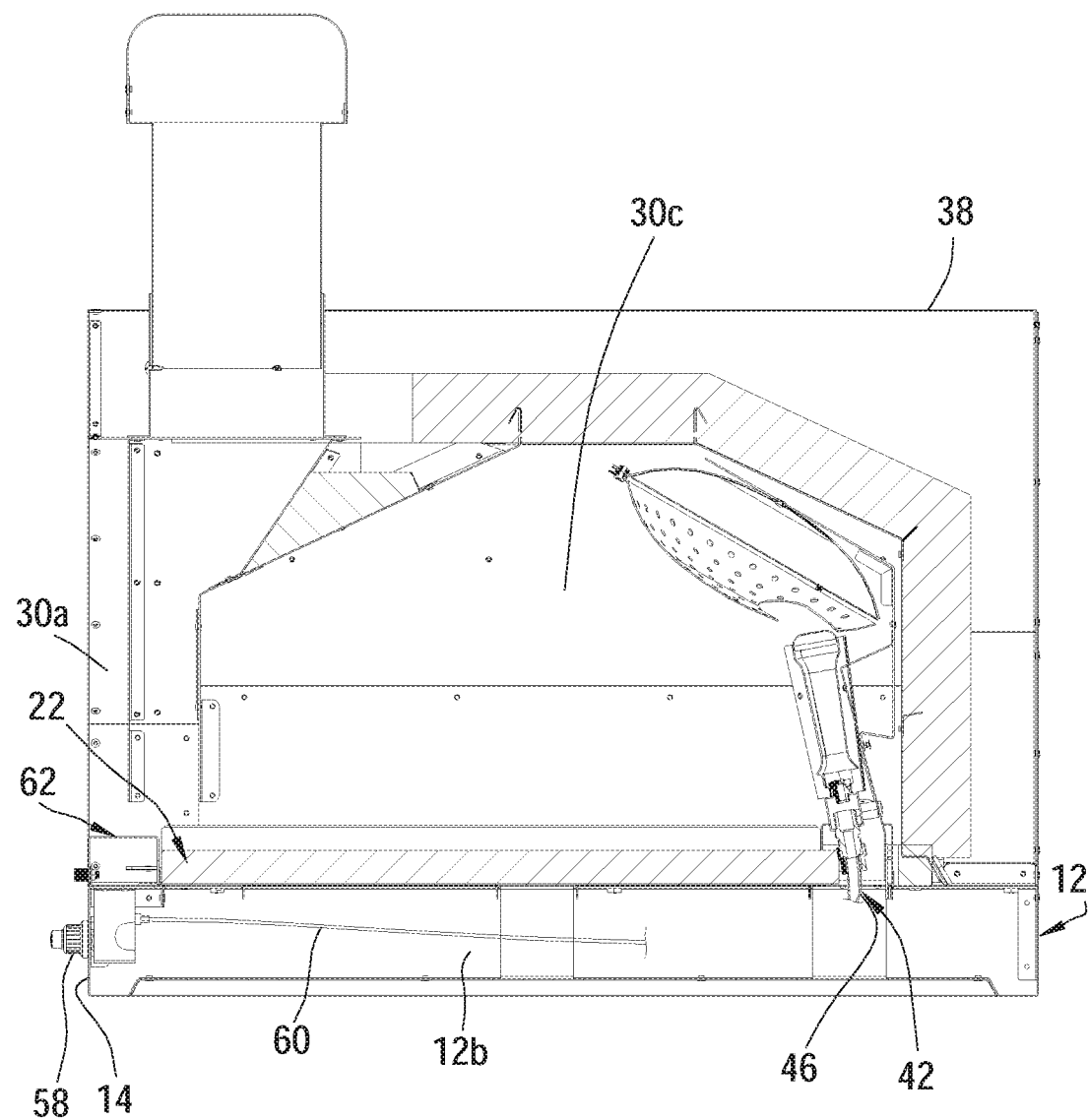
FIG. 2 is a cross-sectional view of FIG. 1 along lines 2-2.
Figure 3:
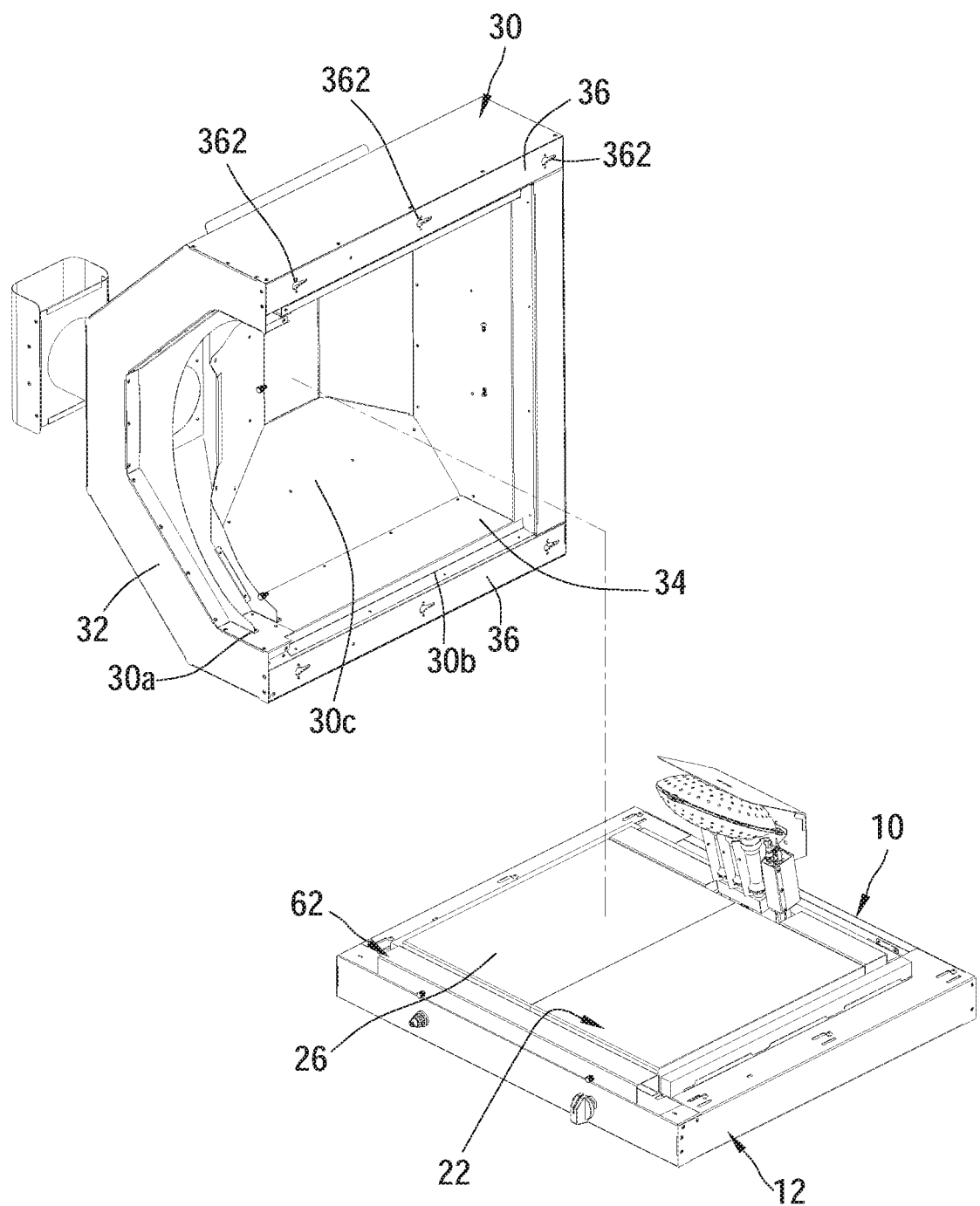
FIG. 3 is a partial exploded perspective view of the kiln of the first embodiment.
Figure 4:
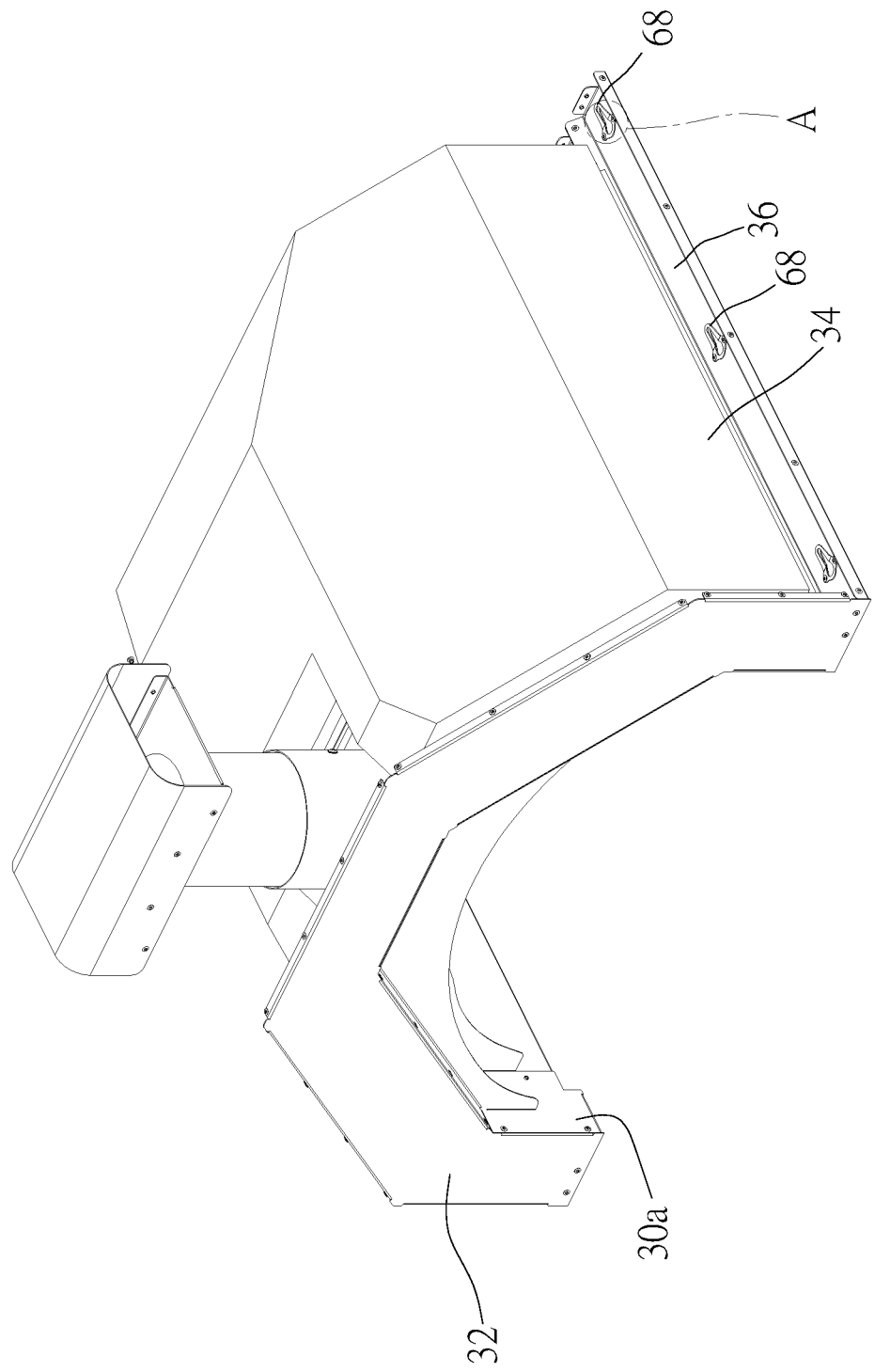
FIG. 4 is a perspective view of a stove of the first embodiment, wherein a cover is not shown.
Figure 5:
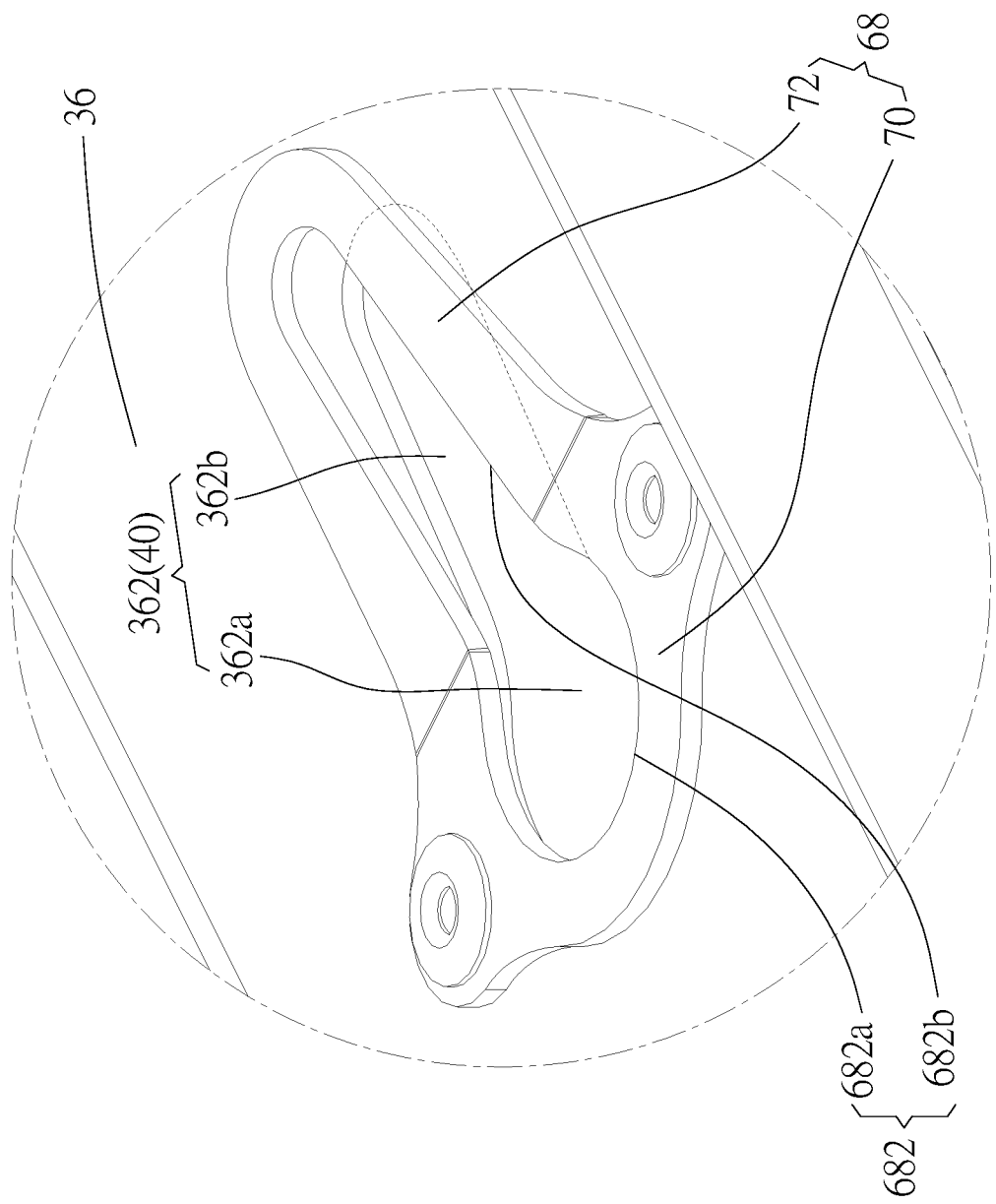
FIG. 5 is a partial enlarged view of part A of FIG. 4.
Figure 6:
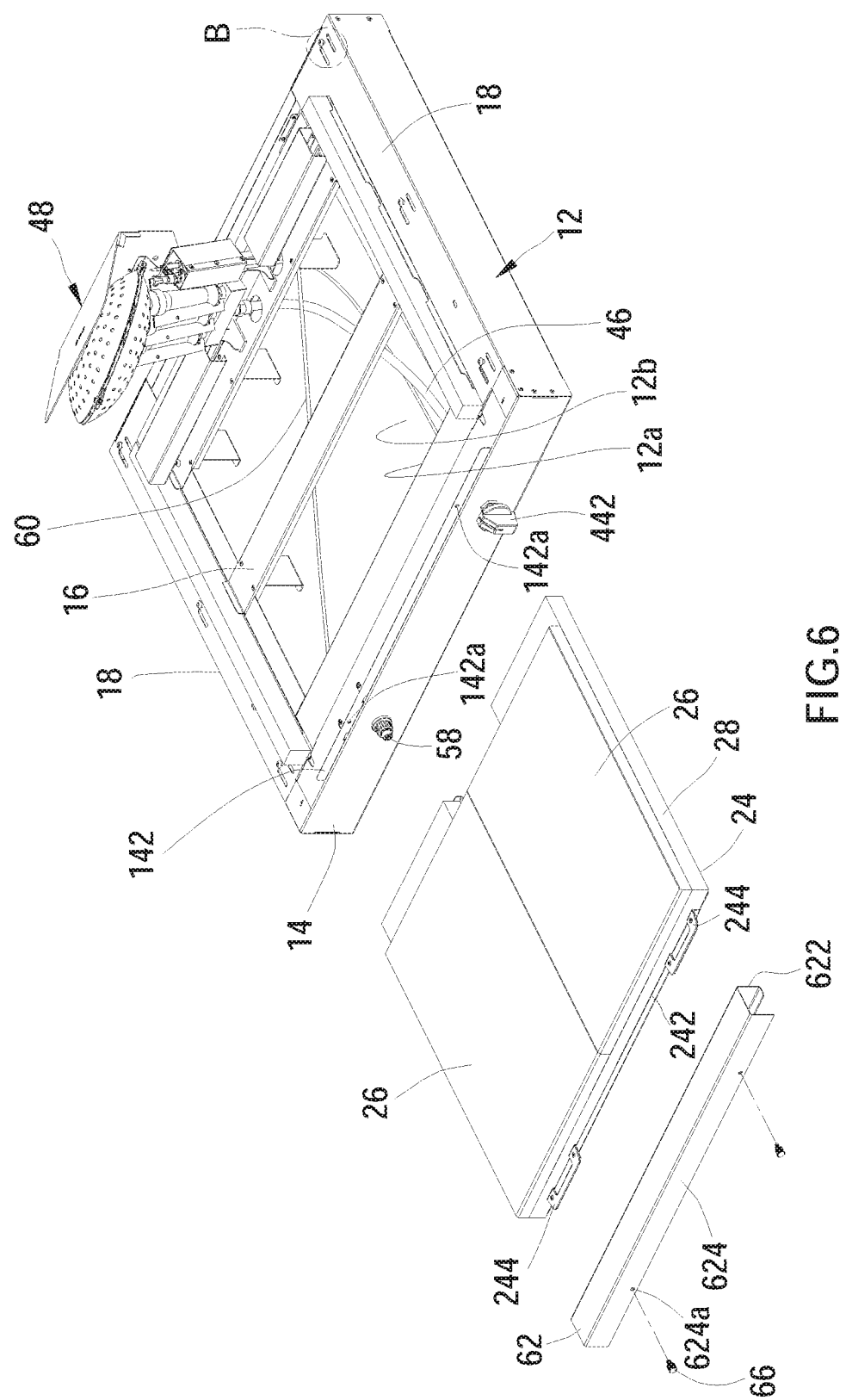
FIG. 6 is a partial exploded perspective view of a stage of the first embodiment.
Figure 7:
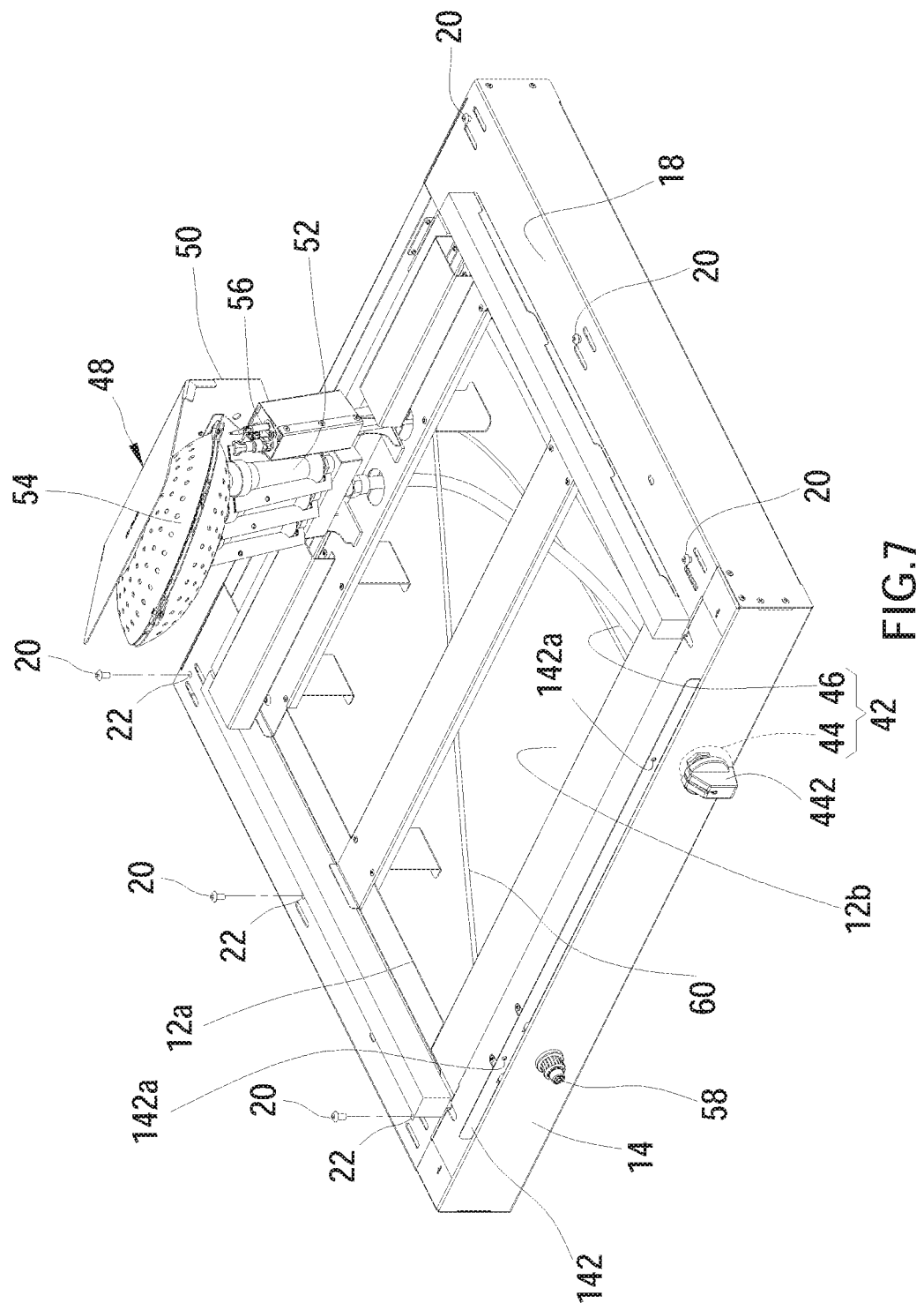
FIG. 7 is a perspective view of a stage body and a combustion device of the first embodiment.
Figure 8:
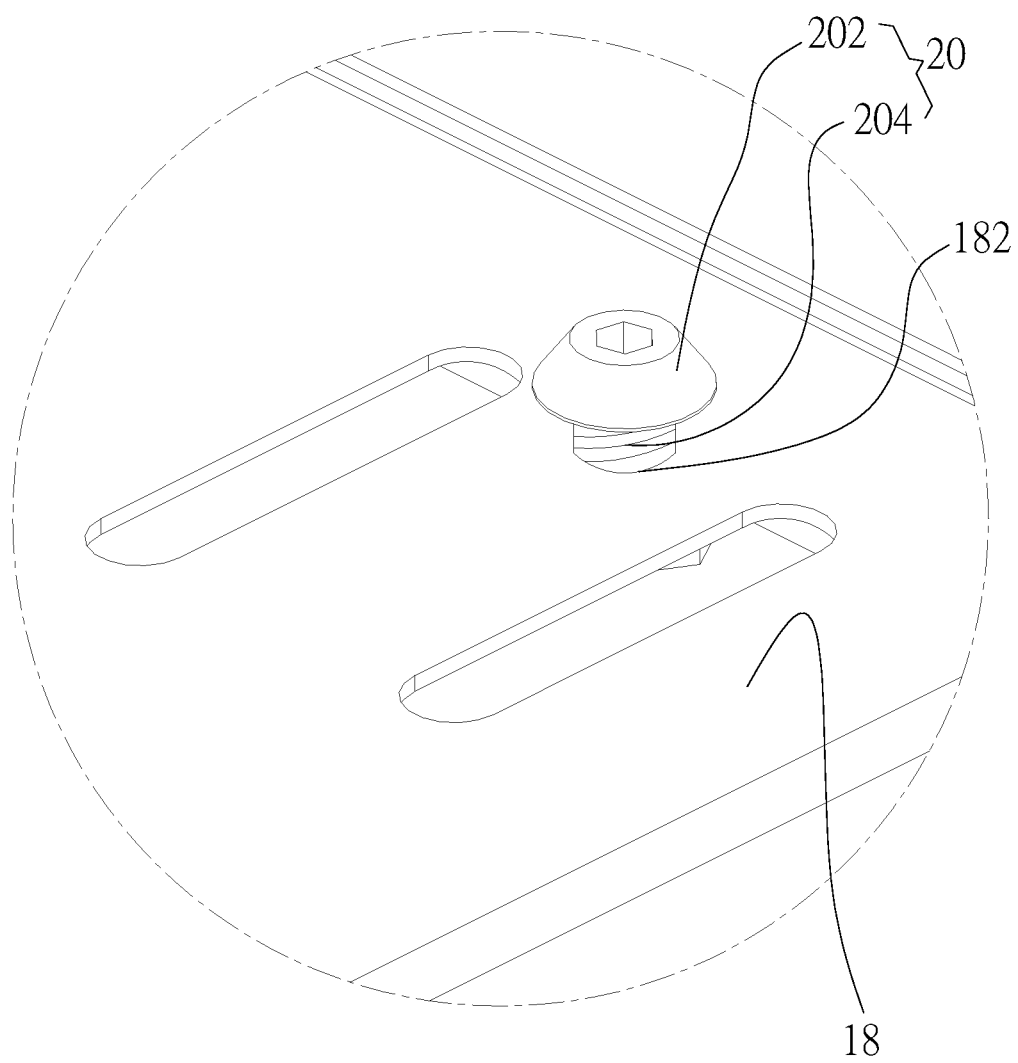
FIG. 8 is a partial enlarged view of part B of FIG. 6.

The following illustrative embodiments and drawings are provided to illustrate the disclosure of the present invention, these and other advantages and effects can be clearly understood by persons skilled in the art after reading the disclosure of this specification.

As illustrated in FIG. 1 to FIG. 14, a kiln of a first embodiment according to the present invention includes a stage 10, a stove 30, a gas supply assembly 42, and a combustion device 48.

The stage 10 includes a stage body 12 and a carrier member 22. Wherein, the stage body 12 includes an upper opening 12a and a first chamber 12b which is located therein. The upper opening 12a is located above the first chamber 12b and communicates with the first chamber 12b. In the current embodiment, the stage body 12 includes a front side plate 14 facing the front side of the kiln, which is a user's location, and a frame 16 located at the upper opening 12a. The stage body 12 further includes two joint parts 18 located respectively at both sides of the upper opening 12a, that is, the upper opening 12a is located between the two joint parts 18. Each joint part 18 is provided with at least one first joint member 20 which is a plurality of first joint members 20 as an example in the current embodiment.

In more detail, each joint part 18 includes at least one joint hole 182 which is a plurality of joint holes 182 as an example in the current embodiment. The joint holes 182 of each joint part 18 are arranged along an axial direction, and each first joint member 20 is detachably joined to one corresponding joint hole 182. Each joint hole 182 is a threaded hole, and each first joint member 20 includes a head 202 and a threaded section 204, wherein each threaded section 204 is joined to one corresponding joint hole 182.

The carrier member 22 is detachably disposed at the stage body 12 and covers the upper opening 12a. In the current embodiment, the carrier member 22 includes a platen 24 and two carrier plates 26. The platen 24 is detachably disposed at the stage body 12 and covers the upper opening 12a. In more details, the platen 24 is placed on the frame 16 and has an outer end 242 which is provided with two handles 244 for the user to catch with fingers to lift or pull the platen 24 from the frame 16. In practice, the handle 244 can be at least one handle.

The two carrier plates 26 are detachably disposed on the platen 24. The platen 24 is made of metal material; each carrier plate 26 is a stone slab, but not limited thereto, and may be a plate such as a metal plate or a ceramic plate. The carrier plate 26 includes at least one carrier plate. The carrier member 22 may further include a thermal insulation pad 28 located between the two carrier plates 26 and the platen 24 to prevent the heat of the two carrier plates 26 from being conducted to the first chamber 12b.

In the current embodiment, a stopper 62 is detachably disposed above the front side plate 14 of the stage body 12. The stopper 62 is located outside the outer end 242 of the platen 24 to block the outer end 242 of the platen 24 for preventing the displacement of the platen 24. In more detail, an extension plate 142 is provided on the top of the front side plate 14. The extension plate 142 has two threaded holes 142a. The stopper 62 is a frame body and has an inner surface 622, which faces the outer end 242 of the platen 24, and an outer surface 624, which has two through holes 624a. Two locking bolts 66 pass through the two corresponding through holes 624a and lock into the two corresponding threaded holes 142a, so that the stopper 62 is fixed above the front side plate 14 of the stage body 12. The inner surface 622 is concavely formed with two openings 622a (shown in FIG. 12.) The two handles 244 extend respectively into the two openings 622a to accommodate the two handles 244, and the inner surface 622 abuts the outer end 242 of the platen 24.

The stove 30 has an entry 30a, a lower opening 30b, and a second chamber 30c which is located therein and communicates with the entry 30a and the lower opening 30b. The stove 30 includes a front plate 32, two side walls 34, and a cover 38. The front plate 32 has the entry 30a, while between the two side walls 34 are the lower opening 30b. Bottoms of the two side walls 34 are respectively placed on the two joint parts 18 of the stage body 12 and are provided with at least one second joint member 40 which includes a plurality of second joint members 40 as an example in the current embodiment. Each second joint member 40 is detachably joined to one corresponding first joint member 20 so that the stove 30 is joined to the stage body 12. The lower opening 30b of the stove 30 faces an upper surface of the carrier plate 26 of the carrier member 22, while the stopper 62 is located at the bottom of the entry 30a.

In the current embodiment, the bottom of each side wall 34 has a joint frame 36. The two joint frames 36 are elongated and extend in the same direction. Each joint frame 36 has at least one through hole 362 which includes a plurality of through holes 362 as an example in the current embodiment. Each through hole 362 of each joint frame 36 forms each second joint member 40. Each first joint member 20 passes through one corresponding through hole 362 and each threaded section 204 is joined to one corresponding joint hole 182. The head of each first joint member 20 is pressed around one corresponding through hole 362 of the joint frame 36 so that the two side walls 34 are fixed at the joint part 18 of the stage body 12. The cover 38 covers the two side walls 34.

Each through hole 362 on the long axis of each joint frame 36 includes a first through hole section 362a and a second through hole section 362b in communication with each other. Each first through hole section 362a is closer to the entry 30a than each second through hole section 362b. A diameter of each first through hole section 362a is greater than that of each second through hole section 362b. An outer diameter of the head 202 of each first joint member 20 is smaller than the diameter of each first through hole section 362a and is greater than the diameter of each second through hole section 362b. When the head 202 of each first joint member 20 passes through one corresponding second through hole section 362b, the head 202 generates a force pressing downwardly around the corresponding second through hole section 362b.

In addition, each joint frame 36 is provided with a plurality of elastic gaskets 68 including a fixed section 70 and an elastic section 72. Each fixed section 70 is joined to one correspond joint frame 36 and is located around one corresponding first through hole section 362a. Each elastic section 72 is located between the head 202 of one corresponding first joint member 20 and one corresponding second through hole section 362b. Each elastic gasket 68 has a penetrating hole 682 including a first penetrating hole section 682a and a second penetrating hole section 682b. The outer diameter of the head 202 of each first joint member 20 is smaller than a diameter of each first penetrating hole section 682a and is greater than a diameter of each second penetrating hole section 682b. Each first penetrating hole section 682a is located at the fixed section 70 and corresponds to one first through hole section 362a, while each second penetrating hole section 682b is located at the elastic section 72 and corresponds to one second through hole section 362b.

Figure 9:
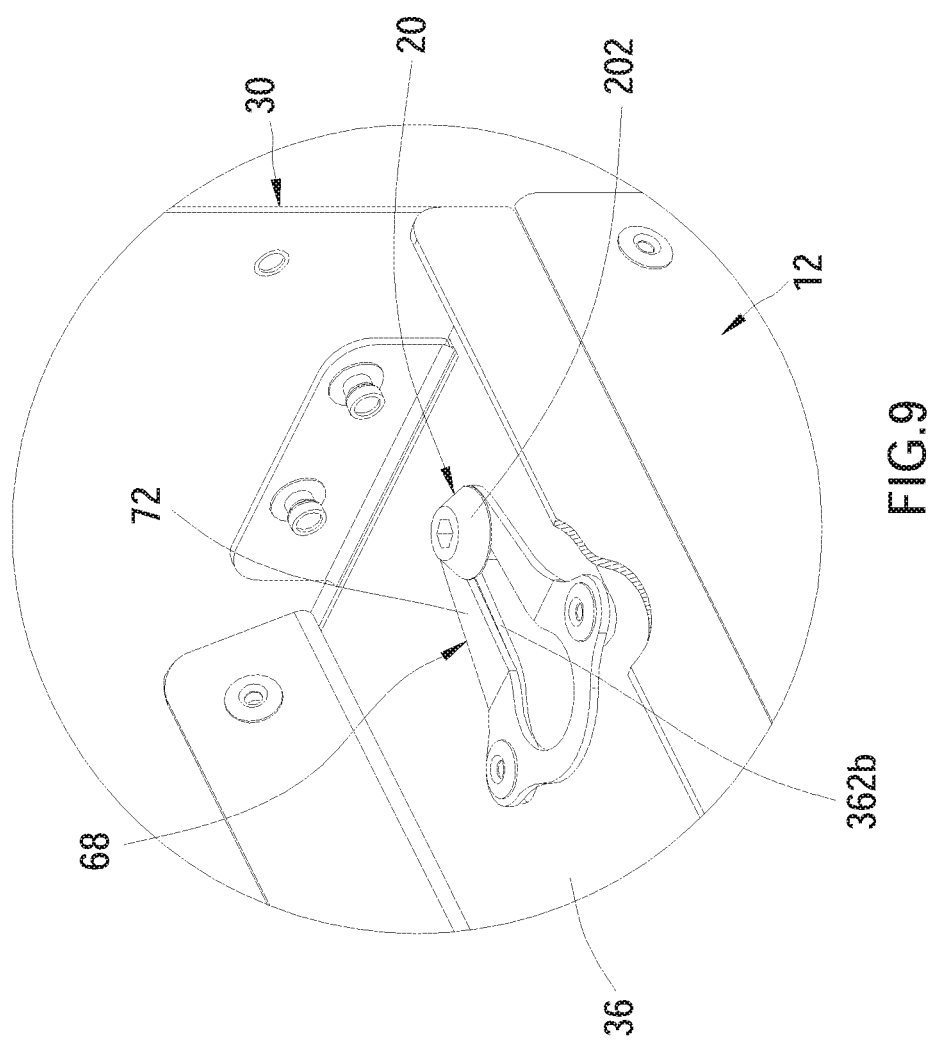
FIG. 9 is a schematic perspective view showing that the stove is joined to the stage body.

During assembly, the stove 30 can be moved to the stage body 12 to aim the two joint frames 36 at the two joint parts 18 (as shown in FIG. 9). Then, each first joint member 20 passes through one corresponding second penetrating hole section 682b and one corresponding second through hole section 362b, so that the head 202 of each first joint member 20 presses around the second through hole section 362b via the elastic section 72. With the elastic section 72 of the elastic gasket 68, the force of pressure is increased to avoid the threaded section 204 of the first joint member 20 from loosening from the joint hole 182.

In practice, the elastic gasket 68 may be optionally not provided, so that the head 202 of each first joint member 20 directly abuts and presses around the corresponding second through hole section 362b.

Figure 10:
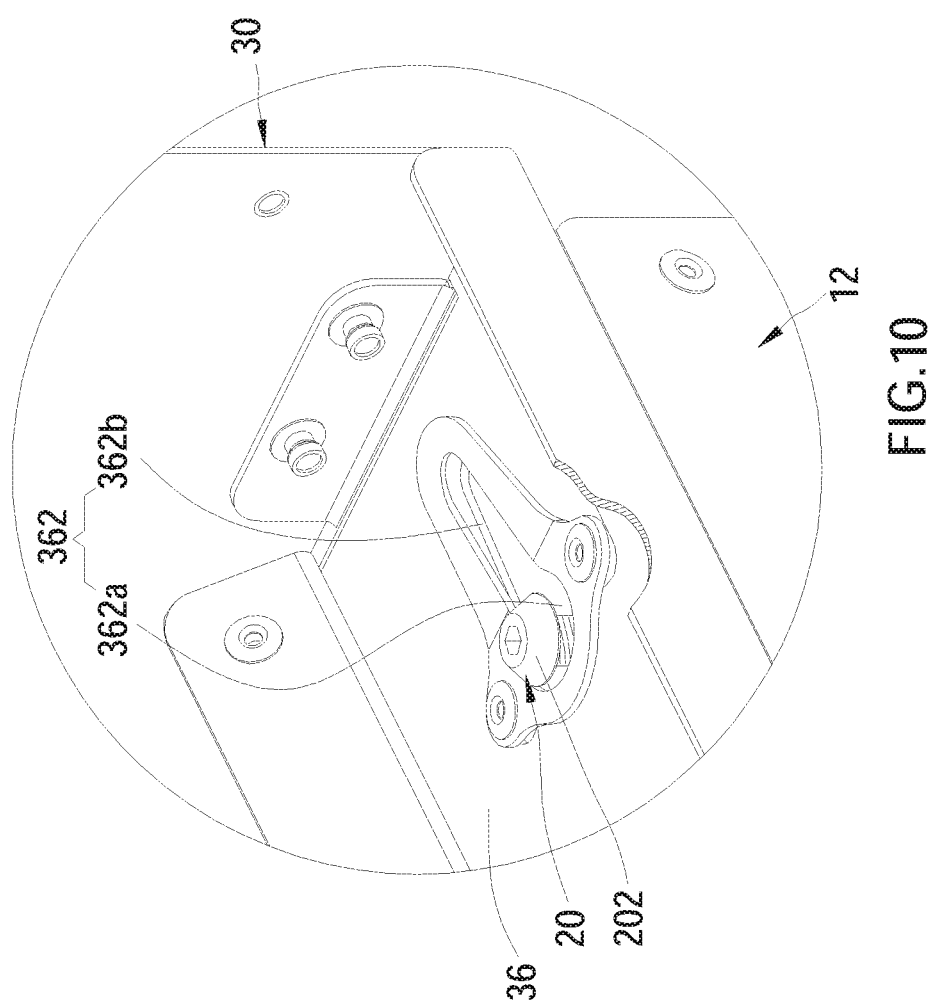
FIG. 10 is a schematic perspective view showing that the stove moves relative to the stage body.
Figure 11:
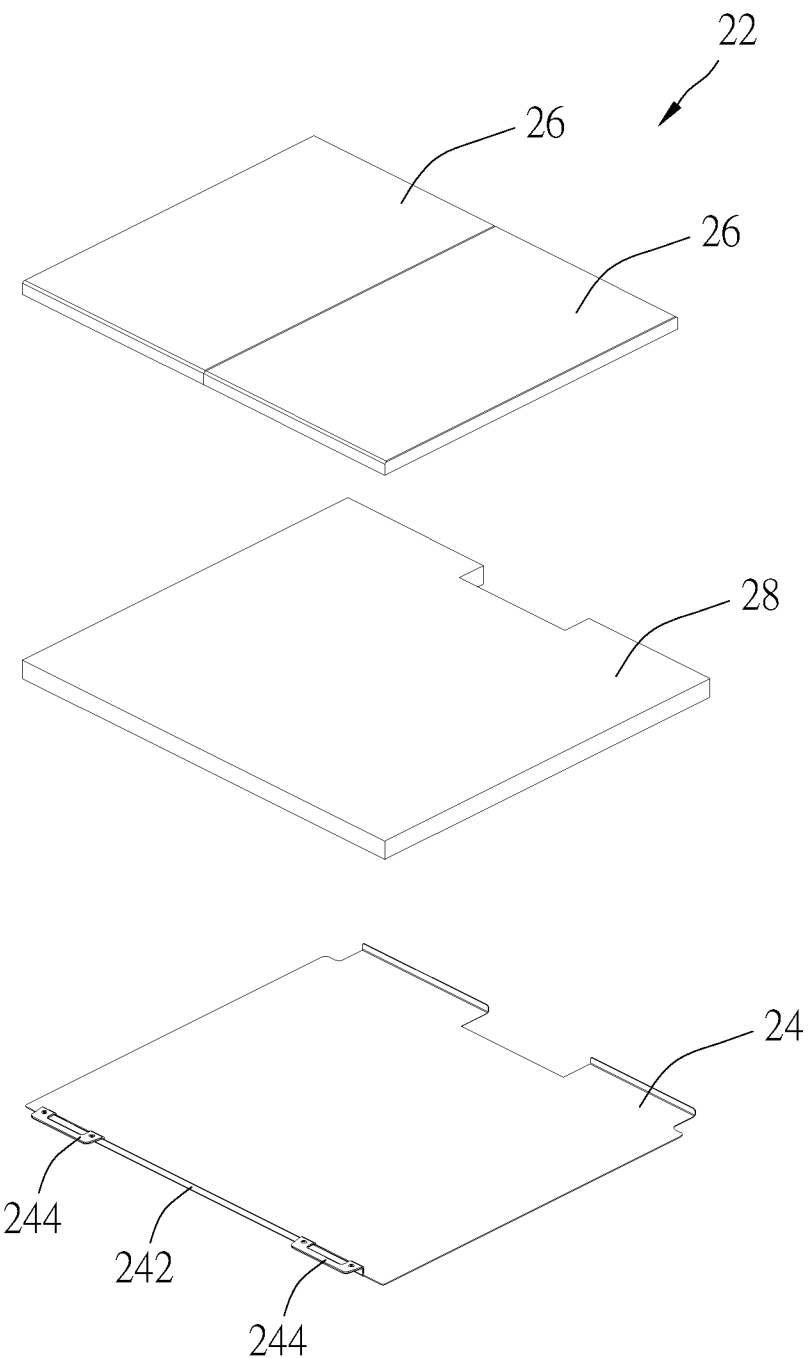
FIG. 11 is an exploded perspective view of a carrier member of the first embodiment.

As shown in FIG. 10, when the stove 30 is to be detached from the stage body 12, it is not necessary to detach each first joint member 20 from the corresponding joint hole 182 after loosening each first joint member 20 relative to the corresponding joint hole 182. The stove 30 is pushed from front to back to move the stove 30 relative to the stage body 12 along the long axis of each joint frame 36 so that the head 202 of each first joint member 20 is disposed at one corresponding first through hole section 362a, that is, the stove 30 can be moved upwardly away from the stage body 12. On the contrary, if the stove 30 is pushed from back to front, the head 202 of each first joint member 20 is disposed at one corresponding second through hole section 362b. After locking the first joint member 20, the stove 30 is fixed onto the stage body 12.

Alternatively, the first joint member 20 may be pre-locked into the joint hole 182 during assembly, and then the stove 30 is placed on the stage body 12 before the stove 30 is disposed on the stage body 12 (as shown in FIG. 10.) After that, the stove 30 is pushed from back to front to disposed the head 202 of each first joint member 20 in one corresponding second through hole section 362b, and then the first joint member 20 is locked (as shown in FIG. 9.) to fix the stove 30 onto the stage body 12.

The gas supply assembly 42 is disposed at the stage body 12 and communicates with a gas source, and part of the gas supply assembly 42 is located at the first chamber 12b. In the current embodiment, the gas supply assembly 42 includes a gas regulating valve 44 and a gas pipe 46. The gas regulating valve 44 is disposed at the front side plate 14, and a knob 442 thereof is located outside the front side plate 14.

The combustion device 48 is located in the second chamber 30c. In the current embodiment, the combustion device 48 includes a supporting bracket 50, a plurality of burners 52, and an infrared ray generation assembly 54. The supporting bracket 50 is mounted on the stage body 12 away from the front side plate 14. The burners 52 are joined to the supporting bracket 50 and communicate with the gas pipe 46 of the gas supply assembly 42. The burners 52 can be at least one burner. The infrared ray generation assembly 54 is joined to the supporting bracket 50 and is located above the burners 52. The combustion device 48 further includes an igniter 56 located at a side of the burners 52.

The front side plate 14 of the stage body 12 is further provided with an ignition switch 58 which is connected to the igniter 56 via a conducting wire 60. When the user presses the ignition switch 58 and switches on the knob 442 of the gas regulating valve 44 to turn on gas, the gas is output to the burners 52 via the gas pipe 46. Meanwhile, sparks generated by the igniter ignite the gas output by the burners 52 to generate flames. The flames heat the infrared ray generation assembly 54 to generate infrared rays to radiate onto the surface of the carrier plate 26. Thereby, the heat generated by the combustion device 48 applies on the second chamber 30c to heat the object in the second chamber 30c.

Figure 12:
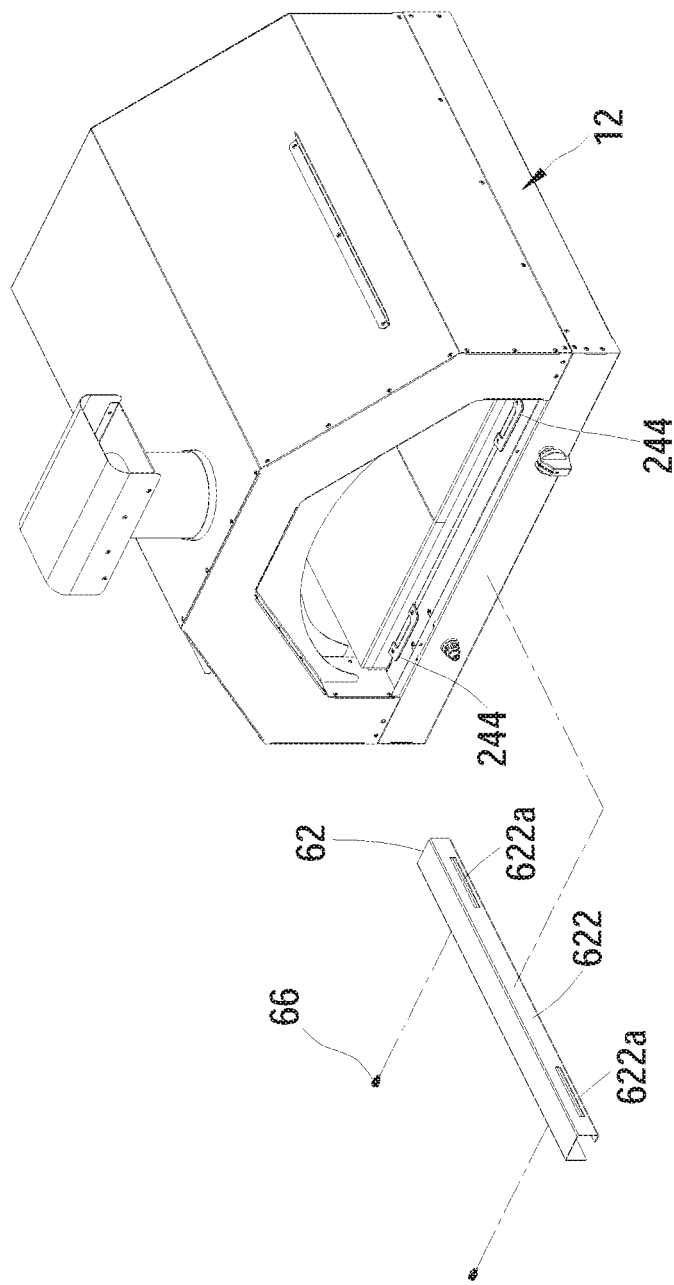
FIG. 12 is a partial exploded perspective view of the kiln of the first embodiment.
Figure 13:
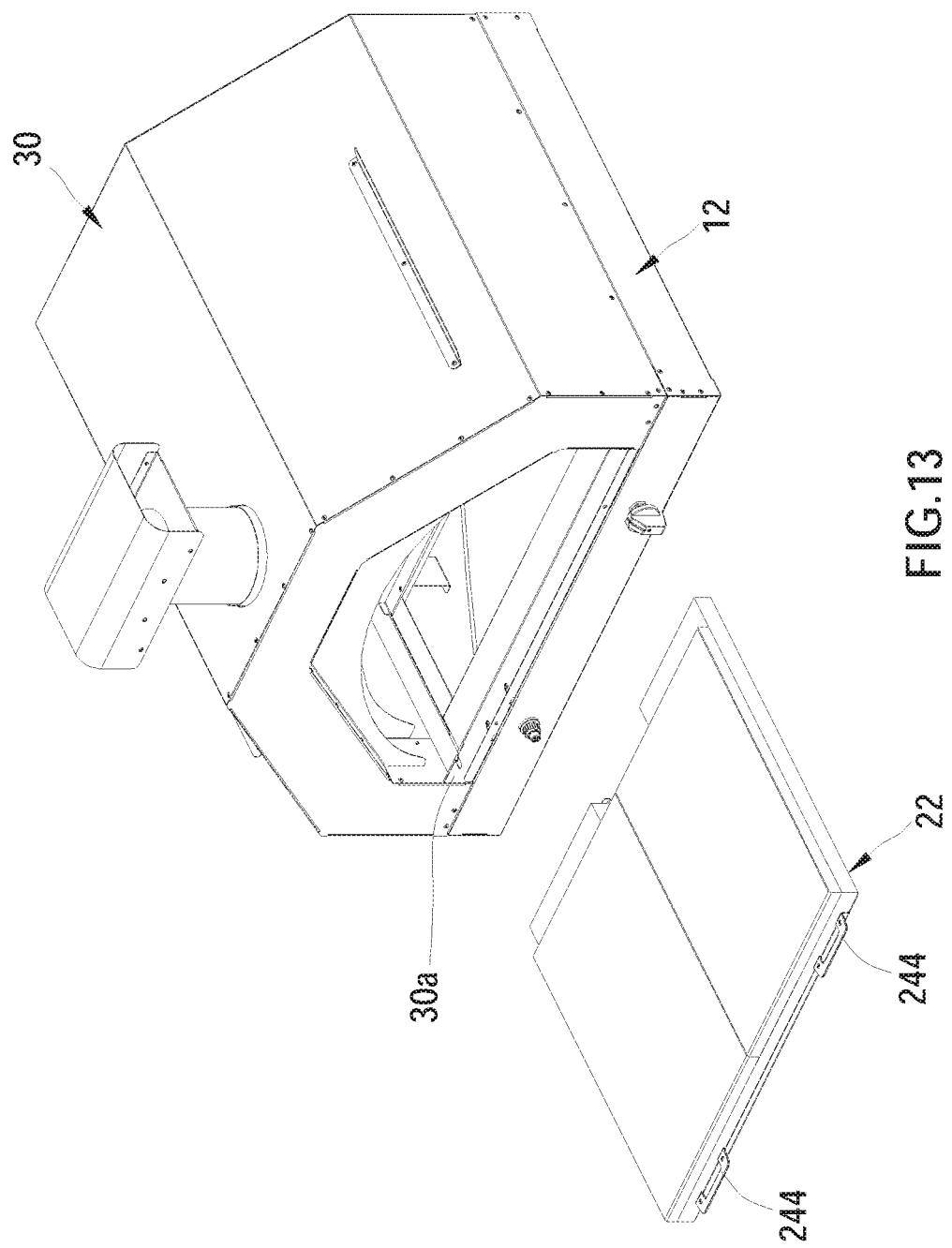
FIG. 13 is a partial exploded perspective view of the kiln of the first embodiment.
Figure 14:
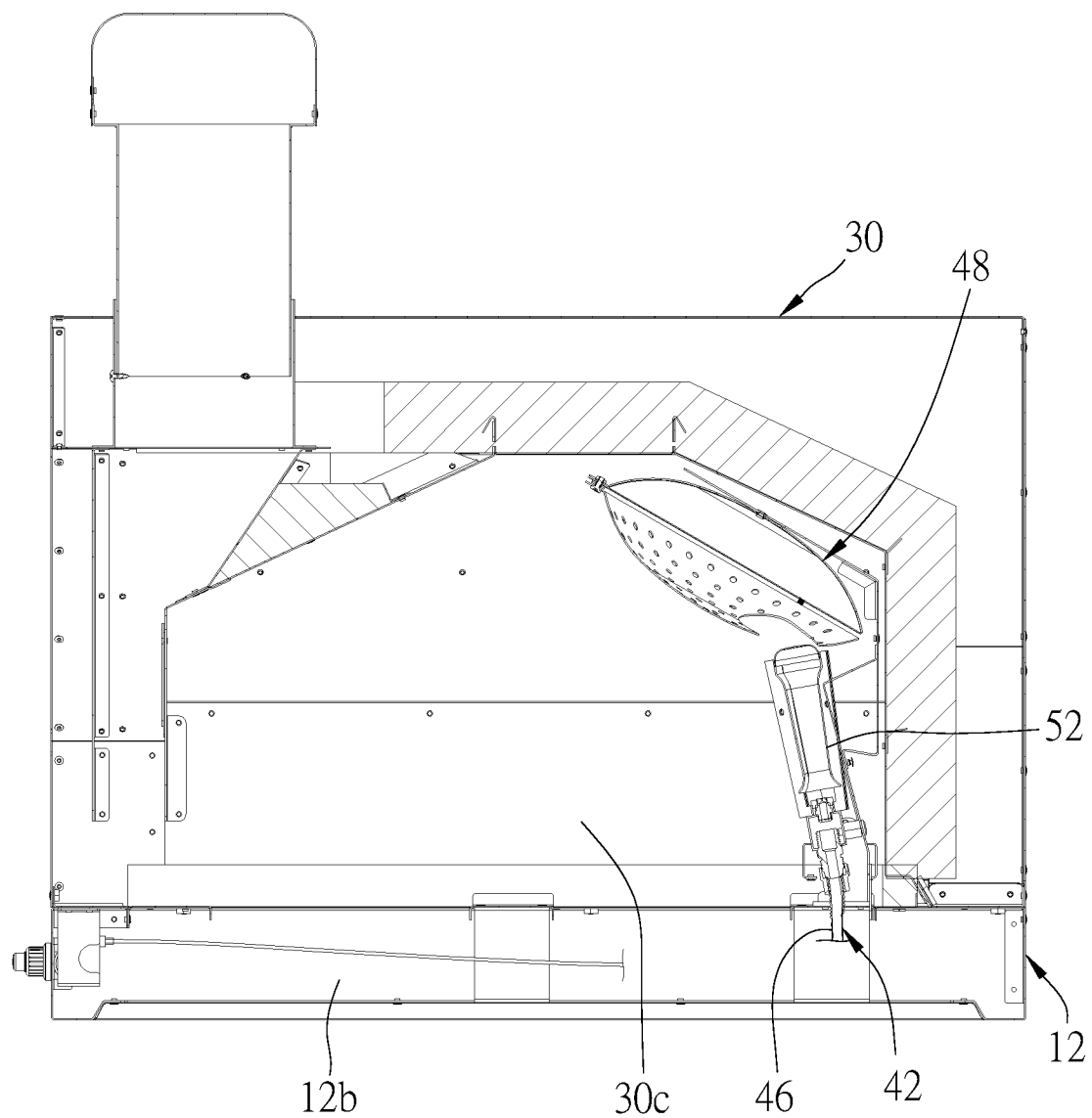
FIG. 14 is a cross-sectional schematic view showing that a first chamber communicates with a second chamber.

As shown in FIG. 12 and FIG. 13, after the stopper 62 is detached from the stage body 12, the two handles 244 are exposed. The user can pull the two handles 244 outwardly with fingers so that the carrier member 22 is detached from the stage body 12 and is moved out of the stove 30 from the entry 30a. As shown in FIG. 14, the first chamber 12b of the stage body 12 communicates with the second chamber 30c of the stove 30 at the moment, that is, there is no carrier member 22 to separate the first chamber 12b from the second chamber 30c. The working space inside the kiln is increased then, which is convenient for the user to repair and maintain the gas supply assembly 42 or the combustion device 42. It is worth mentioning that when the user needs a larger working space, the stove 30 may be detached from the stage body 12 to facilitate the operation.

It must be pointed out that the embodiments described above are only some embodiments of the present invention. All equivalent structures which employ the concepts disclosed in this specification and the appended claims should fall within the scope of the present invention.

What is claimed is:

1. A kiln, comprising:
   a stage including a stage body and a carrier member, wherein the stage body has an upper opening and a first chamber which is located therein and communicates with the upper opening; the carrier member is detachably disposed at the stage body and covers the upper opening; wherein the carrier member includes a platen and at least one carrier plate;
   a stove having an entry, a lower opening, and a second chamber which is located therein and communicates with the entry and the lower opening; the stove is joined to the stage body, while the lower opening faces the carrier member;
   a gas supply assembly disposed at the stage body and communicating with a gas source, and part of the gas supply assembly located at the first chamber; and
   a combustion device located at the second chamber and communicating with the gas supply assembly;
   a stopper detachably disposed at the stage body and is located at a bottom of the entry; the platen having an outer end, and the stopper located outside the outer end to abut against the outer end of the platen;
   wherein, the carrier member can be detached from the stage body and be moved out of the stove from the entry, so that the first chamber communicates with the second chamber.

2. The kiln of claim 1, wherein the platen is detachably disposed at the stage body and covers the upper opening, while the at least one carrier plate is detachably disposed on the platen.

3. The kiln of claim 1, wherein the carrier member includes at least one handle connected to the outer end of the platen.

4. The kiln of claim 3, wherein the stopper has an inner surface which is concavely formed with at least one opening; the at least one handle extends into the at least one opening.

5. The kiln of claim 1, wherein a top of the stage body includes two joint parts, the upper opening is located between the two joint parts, and each joint part is provided with a first joint member; the stove includes two side walls, the lower opening is located between bottoms of the two side walls, the bottom of each side wall is placed at each joint part and provided with a second joint member; each second joint member is detachably joined to one corresponding first joint member so that the stove is joined to the stage body.

6. The kiln of claim 5, wherein each joint part includes a joint hole, each first joint member is joined to one corresponding joint hole and has a head; the bottom of each side wall includes a joint frame which has a through hole forming one second joint member; when each first joint member passes through one corresponding through hole and is joined to one corresponding joint hole, the head of each first joint member generates a force pressing downwardly around the corresponding through hole of each joint frame.

7. The kiln of claim 6, wherein the two joint frames are elongated and extend in the same direction; each through hole includes a first through hole section and a second through hole section in communication with each other along a long axis of each joint frame; a diameter of each first through hole section is greater than a diameter of each second through hole section; an outer diameter of the head of each first joint member is smaller than the diameter of each first through hole section and is greater than the diameter of each second through hole section, and when the head of each first joint member passes through one corresponding second through hole section, the force presses downwardly around the corresponding second through hole section.

8. The kiln of claim 7, including a plurality of elastic gaskets, wherein each elastic gasket has a fixed section and an elastic section, each fixed section is joined to one corresponding joint frame and is located around one corresponding first through hole section, and each elastic section is located between the head of one corresponding first joint member and one corresponding second through hole section.

9. The kiln of claim 8, wherein each elastic gasket has a penetrating hole including a first penetrating hole section and a second penetrating hole section which communicate with each other; the outer diameter of the head of each first joint member is smaller than a diameter of each first penetrating hole section and is greater than a diameter of each second penetrating hole section; each first penetrating hole section corresponds to one first through hole section, each second penetrating hole section corresponds to one second through hole section, and each first joint member passes through one corresponding second penetrating hole section and one corresponding second through hole section.

10. The kiln of claim 7, wherein each joint hole is a threaded hole, each first joint member includes a threaded section joined to one corresponding threaded hole; after loosening each first joint member relative to the corresponding threaded hole, the stove can be moved relative to the stage body along the long axis of each joint frame so that the head of each first joint member is disposed at one corresponding first through hole section.

11. A kiln, comprising:
a stage including a stage body and a carrier member, wherein the stage body has an upper opening and a first chamber which is located therein and communicates with the upper opening; the carrier member is detachably disposed at the stage body and covers the upper opening;
a stove having an entry, a lower opening, and a second chamber which is located therein and communicates with the entry and the lower opening; the stove is joined to the stage body, while the lower opening faces the carrier member;
a gas supply assembly disposed at the stage body and communicating with a gas source, and part of the gas supply assembly located at the first chamber; and
a combustion device located at the second chamber and communicating with the gas supply assembly;
wherein, the carrier member can be detached from the stage body and be moved out of the stove from the entry, so that the first chamber communicates with the second chamber;
wherein a top of the stage body includes two joint parts, the upper opening is located between the two joint parts, and each joint part is provided with a first joint member; the stove includes two side walls, the lower opening is located between bottoms of the two side walls, the bottom of each side wall is placed at each joint part and provided with a second joint member; each second joint member is detachably joined to one corresponding first joint member so that the stove is joined to the stage body;
wherein each joint part includes a joint hole, each first joint member is joined to one corresponding joint hole and has a head; the bottom of each side wall includes a joint frame which has a through hole forming one second joint member; when each first joint member passes through one corresponding through hole and is joined to one corresponding joint hole, the head of each first joint member generates a force pressing downwardly around the corresponding through hole of each joint frame.

12. The kiln of claim 11, wherein the carrier member includes a platen and at least one carrier plate, the platen is detachably disposed at the stage body and covers the upper opening, while the at least one carrier plate is detachably disposed on the platen.

13. The kiln of claim 12, comprising a stopper which is detachably disposed at the stage body and is located at a bottom of the entry; the platen having an outer end, and the stopper located outside the outer end.

14. The kiln of claim 13, wherein the carrier member includes at least one handle connected to the outer end of the platen.

15. The kiln of claim 14, wherein the stopper has an inner surface which is concavely formed with at least one opening; the at least one handle extends into the at least one opening.

16. The kiln of claim 11, wherein the two joint frames are elongated and extend in the same direction; each through hole includes a first through hole section and a second through hole section in communication with each other along a long axis of each joint frame; a diameter of each first through hole section is greater than a diameter of each second through hole section; an outer diameter of the head of each first joint member is smaller than the diameter of each first through hole section and is greater than the diameter of each second through hole section, and when the head of each first joint member passes through one corresponding second through hole section, the force presses downwardly around the corresponding second through hole section.

17. The kiln of claim 16, including a plurality of elastic gaskets, wherein each elastic gasket has a fixed section and an elastic section, each fixed section is joined to one corresponding joint frame and is located around one corresponding first through hole section, and each elastic section is located between the head of one corresponding first joint member and one corresponding second through hole section.

18. The kiln of claim 17, wherein each elastic gasket has a penetrating hole including a first penetrating hole section and a second penetrating hole section which communicate with each other; the outer diameter of the head of each first joint member is smaller than a diameter of each first penetrating hole section and is greater than a diameter of each second penetrating hole section; each first penetrating hole section corresponds to one first through hole section, each second penetrating hole section corresponds to one second through hole section, and each first joint member passes through one corresponding second penetrating hole section and one corresponding second through hole section.

19. The kiln of claim 16, wherein each joint hole is a threaded hole, each first joint member includes a threaded section joined to one corresponding threaded hole; after loosening each first joint member relative to the corresponding threaded hole, the stove can be moved relative to the stage body along the long axis of each joint frame so that the head of each first joint member is disposed at one corresponding first through hole section.

\* \* \* \* \*